United States Patent
Yuan et al.

(10) Patent No.: US 9,824,710 B1
(45) Date of Patent: Nov. 21, 2017

(54) HEAT-ASSISTED MAGNETIC RECORDING (HAMR) MEDIUM WITH THERMAL BARRIER LAYER IN MULTILAYERED HEAT-SINK STRUCTURE

(71) Applicant: Western Digital Technologies, Inc., San Jose, CA (US)

(72) Inventors: Hua Yuan, San Ramon, CA (US); Shahid Ali Pirzada, Fremont, CA (US); Hoan Cong Ho, San Jose, CA (US); Paul Christopher Dorsey, Los Altos, CA (US); B. Ramamurthy Acharya, Fremont, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/583,392

(22) Filed: May 1, 2017

(51) Int. Cl.
| G11B 5/66 | (2006.01) |
| G11B 5/73 | (2006.01) |
| G11B 5/65 | (2006.01) |
| G11B 5/82 | (2006.01) |
| G11B 5/00 | (2006.01) |

(52) U.S. Cl.
CPC ............ *G11B 5/7325* (2013.01); *G11B 5/653* (2013.01); *G11B 5/656* (2013.01); *G11B 5/82* (2013.01); *G11B 2005/0021* (2013.01)

(58) Field of Classification Search
None
See application file for complete search history.

(56) References Cited

U.S. PATENT DOCUMENTS

| 8,173,282 | B1 * | 5/2012 | Sun | G11B 5/65 204/192.1 |
| 8,509,039 | B1 | 8/2013 | Huang et al. | |
| 8,576,672 | B1 * | 11/2013 | Peng | G11B 5/7325 369/13.01 |
| 8,941,950 | B2 | 1/2015 | Yuan et al. | |
| 9,406,329 | B1 | 8/2016 | Ho et al. | |
| 2011/0235479 | A1 * | 9/2011 | Kanbe | G11B 5/7325 369/13.32 |
| 2013/0314815 | A1 * | 11/2013 | Yuan | G11B 5/65 360/59 |

* cited by examiner

*Primary Examiner* — Will J Klimowicz
(74) *Attorney, Agent, or Firm* — Thomas R. Berthold

(57) ABSTRACT

A heat-assisted magnetic recording (HAMR) medium has a multilayered or laminated heat-sink structure. The laminated heat-sink structure includes a first heat-sink layer and a RuAl—X thermal barrier layer between the medium substrate and the first heat-sink layer. The laminated heat-sink structure may include a second heat-sink layer may between the substrate and the RuAl—X thermal barrier layer. In the RuAl—X thermal barrier layer, X is selected from C and one or more oxides of Si, Ti, W, Zr and Hf. The HAMR medium with the laminated heat-sink structure reduces the amount of required laser current as compared to a similar HAMR medium with a conventional single heat-sink layer of the same thickness, while also slightly improving magnetic properties and recording performance.

23 Claims, 5 Drawing Sheets

HEAT-ASSISTED MAGNETIC RECORDING (HAMR) MEDIUM WITH THERMAL BARRIER LAYER IN MULTILAYERED HEAT-SINK STRUCTURE

BACKGROUND

Field of the Invention

This invention relates generally to a perpendicular magnetic recording medium for use as a heat-assisted magnetic recording (HAMR) medium, and more particularly to a HAMR medium that allows for reduced laser current.

Description of the Related Art

In conventional continuous granular magnetic recording media, the magnetic recording layer is a continuous layer of granular magnetic material over the entire surface of the disk. In magnetic recording disk drives the magnetic material (or media) for the recording layer on the disk is chosen to have sufficient coercivity such that the magnetized data regions that define the data "bits" are written precisely and retain their magnetization state until written over by new data bits. As the areal data density (the number of bits that can be recorded on a unit surface area of the disk) increases, the magnetic grains that make up the data bits can be so small that they can be demagnetized simply from thermal instability or agitation within the magnetized bit (the so-called "superparamagnetic" effect). To avoid thermal instabilities of the stored magnetization, media with high magneto-crystalline anisotropy ($K_u$) are required. The thermal stability of a magnetic grain is to a large extent determined by $K_u V$, where V is the volume of the magnetic grain. Thus a recording layer with a high $K_u$ is important for thermal stability. However, increasing $K_u$ also increases the coercivity of the media, which can exceed the write field capability of the write head.

Since it is known that the coercivity of the magnetic material of the recording layer is temperature dependent, one proposed solution to the thermal stability problem is heat-assisted magnetic recording (HAMR), wherein the magnetic recording material is heated locally during writing to lower the coercivity enough for writing to occur, but where the coercivity/anisotropy is high enough for thermal stability of the recorded bits at the ambient temperature of the disk drive (i.e., the normal operating temperature range of approximately 15-60° C.). In some proposed HAMR systems, the magnetic recording material is heated to near or above its Curie temperature. The recorded data is then read back at ambient temperature by a conventional magnetoresistive read head.

The most common type of proposed HAMR disk drive uses a laser source and an optical waveguide with a near-field transducer (NFT). A "near-field" transducer refers to "near-field optics", wherein the passage of light is through an element with sub-wavelength features and the light is coupled to a second element, such as a substrate like a magnetic recording medium, located a sub-wavelength distance from the first element. The NFT is typically located at the air-bearing surface (ABS) of the air-bearing slider that also supports the read/write head and rides or "flies" above the disk surface.

One type of proposed high-$K_u$ HAMR media with perpendicular magnetic anisotropy is an alloy of FePt (or CoPt) alloy chemically-ordered in the $L1_0$ phase. The chemically-ordered FePt alloy, in its bulk form, is known as a face-centered tetragonal (FCT) $L1_0$-ordered phase material (also called a CuAu material). The c-axis of the $L1_0$ phase is the easy axis of magnetization and is oriented perpendicular to the disk substrate. The FePt alloy requires deposition at high temperature or subsequent high-temperature annealing to achieve the desired chemical ordering to the $L1_0$ phase.

The FePt alloy magnetic layer also typically includes a segregant like C, $SiO_2$, $TiO_2$, $TaO_x$, $ZrO_2$, SiC, SiN, TiC, TiN, B, BC or BN that forms between the FePt grains and reduces the grain size. To obtain the required microstructure and magnetic properties, the FePt needs to be deposited with the substrate maintained at high temperatures (e.g., about 500 to 700° C.). In HAMR media, a MgO underlayer is used as a seed layer to induce the desirable (001) texture to the FePt magnetic grains and influence their geometrical microstructure and to also act as a thermal barrier layer so that heat from the NFT is not dissipated too rapidly from the FePt recording layer.

SUMMARY

However, a problem associated with a HAMR disk is optimization of the amount of heat to the FePt recording layer. If the thermal conductivity of the MgO seed/thermal barrier layer is too high the heat from the NFT will be distributed too rapidly, which will require more laser power to heat the FePt material. If the thermal conductivity of the MgO seed/thermal barrier layer is too low the heat from the NFT will be confined to the FePt recording layer and will spread laterally through the recording layer. This is undesirable because the lateral spreading of the heat may cause recorded data in adjacent data tracks to be overwritten. To minimize this effect a heat-sink layer is located below the MgO seed/thermal barrier layer to facilitate the transfer of heat away from the FePt recording layer. The heat-sink layer is typically a single layer of a material that is a good thermal conductor, like Cu, Au, Ag, Cr, Mo or W or other suitable metals or metal alloys.

Embodiments of the invention relate to a HAMR medium with a multilayered or laminated heat-sink structure. The multilayered heat-sink structure includes a first heat-sink layer and a RuAl—X thermal barrier layer between the substrate and the first heat-sink layer. The multilayered heat-sink structure may include a second heat-sink layer may between the substrate and the RuAl—X thermal barrier layer. In the two heat-sink layer embodiment the first heat-sink layer, the one closer to the MgO seed/thermal barrier layer, preferably makes up at least 15% of the total thickness of the laminated layer. In the RuAl—X thermal barrier layer, X is selected from C and one or more oxides of Si, Ti, W, Zr and Hf. The HAMR medium with the laminated heat-sink structure reduces the amount of required laser current as compared to a similar HAMR medium with a conventional single heat-sink layer of the same thickness, while also slightly improving magnetic properties.

For a fuller understanding of the nature and advantages of the present invention, reference should be made to the following detailed description taken together with the accompanying figures.

DETAILED DESCRIPTION

Figure 1:
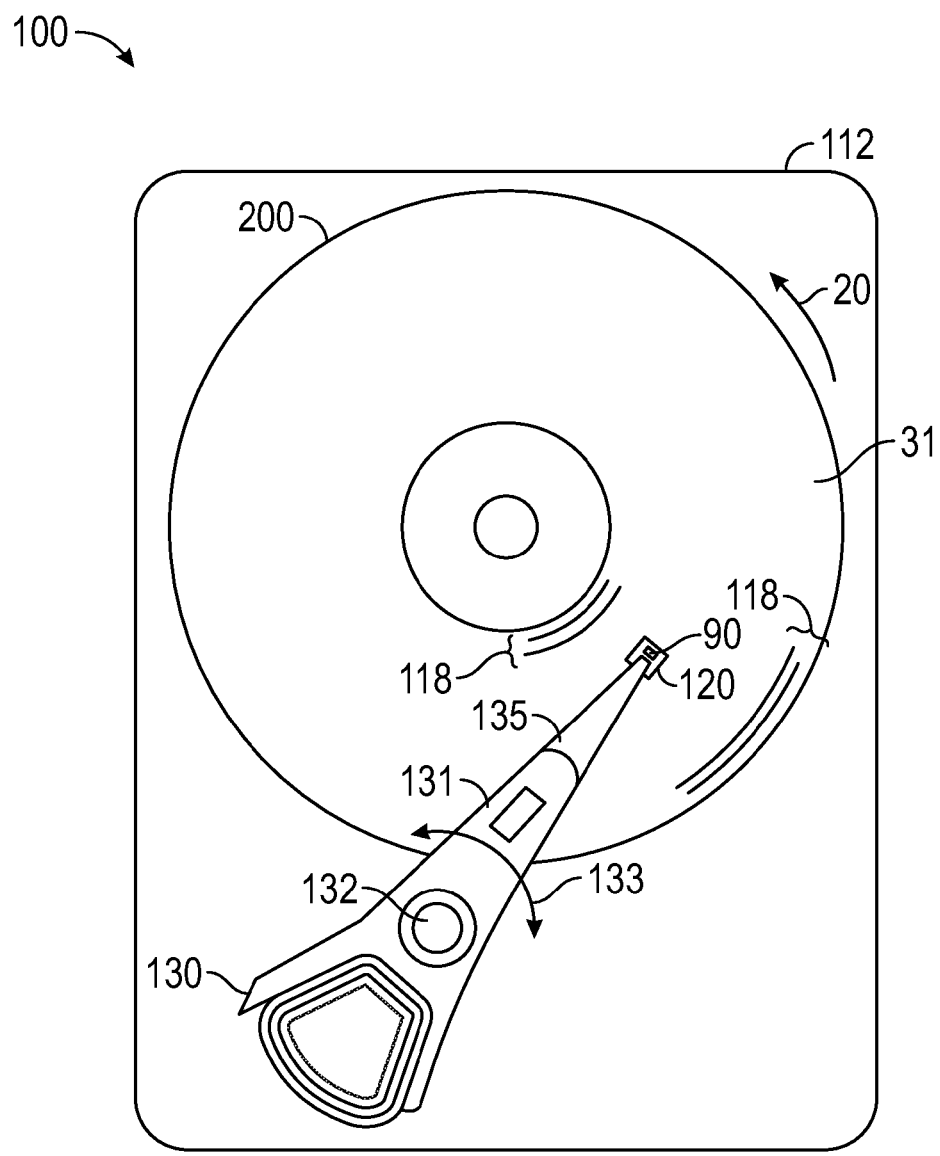
FIG. 1 is a top view of a heat-assisted magnetic recording (HAMR) disk drive according to the prior art.

FIG. 1 is a top view of a heat-assisted magnetic recording (HAMR) disk drive 100 according to the prior art. In FIG. 1, the HAMR disk drive 100 is depicted with a disk 200 with a continuous magnetic recording layer 31 with concentric circular data tracks 118. Only a portion of a few representative tracks 118 near the inner and outer diameters of disk 200 are shown.

The drive 100 has a housing or base 112 that supports an actuator 130 and a drive motor for rotating the magnetic recording disk 200. The actuator 130 may be a voice coil motor (VCM) rotary actuator that has a rigid arm 131 and rotates about pivot 132 as shown by arrow 133. A head-suspension assembly includes a suspension 135 that has one end attached to the end of actuator arm 131 and a head carrier, such as an air-bearing slider 120, attached to the other end of suspension 135. The suspension 135 permits the slider 120 to be maintained very close to the surface of disk 200 and enables it to "pitch" and "roll" on the air-bearing generated by the disk 200 as it rotates in the direction of arrow 20. The slider 120 supports the HAMR head (not shown), which includes a magnetoresistive read head, an inductive write head, the near-field transducer (NFT) and optical waveguide. A semiconductor laser 90, for example with a wavelength of 780 to 980 nm, may be used as the HAMR light source and is depicted as being supported on the top of slider 120. Alternatively, the laser may be located on suspension 135 and coupled to slider 120 by an optical channel. As the disk 200 rotates in the direction of arrow 20, the movement of actuator 130 allows the HAMR head on the slider 120 to access different data tracks 118 on disk 200. The slider 120 is typically formed of a composite material, such as a composite of alumina/titanium-carbide ($Al_2O_3$/TiC). Only one disk surface with associated slider and read/write head is shown in FIG. 1, but there are typically multiple disks stacked on a hub that is rotated by a spindle motor, with a separate slider and HAMR head associated with each surface of each disk.

Figure 2:
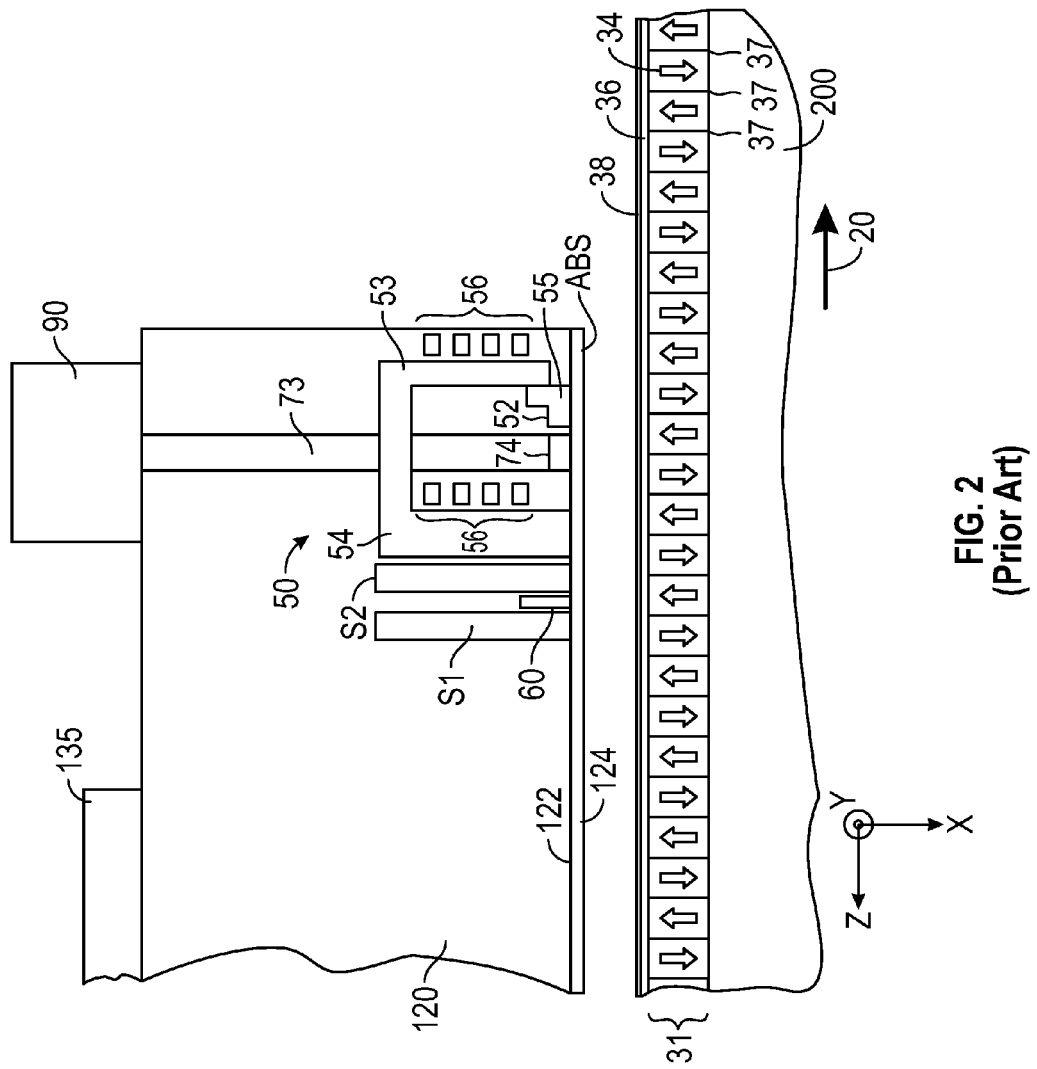
FIG. 2 depicts a sectional view, not drawn to scale because of the difficulty in showing the very small features, of an air-bearing slider for use in HAMR disk drive and a portion of a HAMR disk according to the prior.

In the following drawings, the X direction denotes a direction perpendicular to the air-bearing surface (ABS) of the slider, the Y direction denotes a track width or cross-track direction, and the Z direction denotes an along-the-track direction. FIG. 2A is a schematic cross-sectional view illustrating a configuration example of a HAMR head according to the prior art, which is also capable of functioning as the HAMR head in embodiments of this invention. In FIG. 2A, the disk 200 is depicted as a conventional disk with the HAMR recording layer 31 being a continuous non-patterned magnetic recording layer of magnetizable material with magnetized regions or "bits" 34. The bits 34 are physically adjacent to one another and the boundaries of adjacent bits are referred to as magnetic transitions 37. The bits are recorded in individual data sectors. The recording layer 31 is typically formed of a high-anisotropy ($K_u$) substantially chemically-ordered FePt alloy (or CoPt alloy) with perpendicular magnetic anisotropy. The disk includes an overcoat 36, typically formed of amorphous diamond-like carbon (DLC), and a liquid lubricant layer 38, typically a bonded perfluoropolyether (PFPE).

The air-bearing slider 120 is supported by suspension 135. The slider 120 has a recording-layer-facing surface 122 onto which an overcoat 124 is deposited. The overcoat 124 is typically a DLC overcoat with a thickness in the range of about 10 to 30 Å and whose outer surface forms the ABS of the slider 120. An optional adhesion film or undercoat (not shown), such as a 1 to 5 Å silicon nitride ($SiN_x$) film, may be deposited on the surface 122 before deposition of the overcoat 124. The slider 120 supports the magnetic write head 50, magnetoresistive (MR) read head 60, and magnetically permeable read head shields S1 and S2. A recording magnetic field is generated by the write head 50 made up of a coil 56, a main magnetic pole 53 for transmitting flux generated by the coil 56, a write pole 55 with end 52, and a return pole 54. A magnetic field generated by the coil 56 is transmitted through the magnetic pole 53 to the write pole end 52 located near an optical near-field transducer (NFT) 74. The write head 50 is typically capable of operating at different clock rates so as to be able to write data at different frequencies. The NFT 74, also known as a plasmonic antenna, typically uses a low-loss metal (e.g., Au, Ag, Al or Cu) shaped in such a way to concentrate surface charge motion at a tip located at the slider ABS when light from the waveguide 73 is incident. Oscillating tip charge creates an intense near-field pattern, heating the recording layer 31. Sometimes, the metal structure of the NFT can create resonant charge motion (surface plasmons) to further increase intensity and heating of the recording layer. At the moment of recording, the recording layer 31 of disk 200 is heated by the optical near-field generated by the NFT 74 and, at the same time, a region or "bit" 34 is magnetized and thus written onto the recording layer 31 by applying a recording magnetic field generated by the write pole end 52.

A semiconductor laser 90 is mounted to the top surface of slider 120. An optical waveguide 73 for guiding light from laser 90 to the NFT 74 is formed inside the slider 120. The laser 90 is typically capable of operating at different power levels. Materials that ensure a refractive index of the waveguide 73 core material to be greater than a refractive index of the cladding material may be used for the waveguide 73. For example, $Al_2O_3$ may be used as the cladding material and $TiO_2$, $Ta_2O_5$ and $SiO_xN_y$ as the core material. Alternatively, $SiO_2$ may be used as the cladding material and $Ta_2O_5$, $TiO_2$, $SiO_xN_y$, or Ge-doped $SiO_2$ as the core material. The waveguide 73 that delivers light to NFT 74 is preferably a single-mode waveguide.

Figure 3:
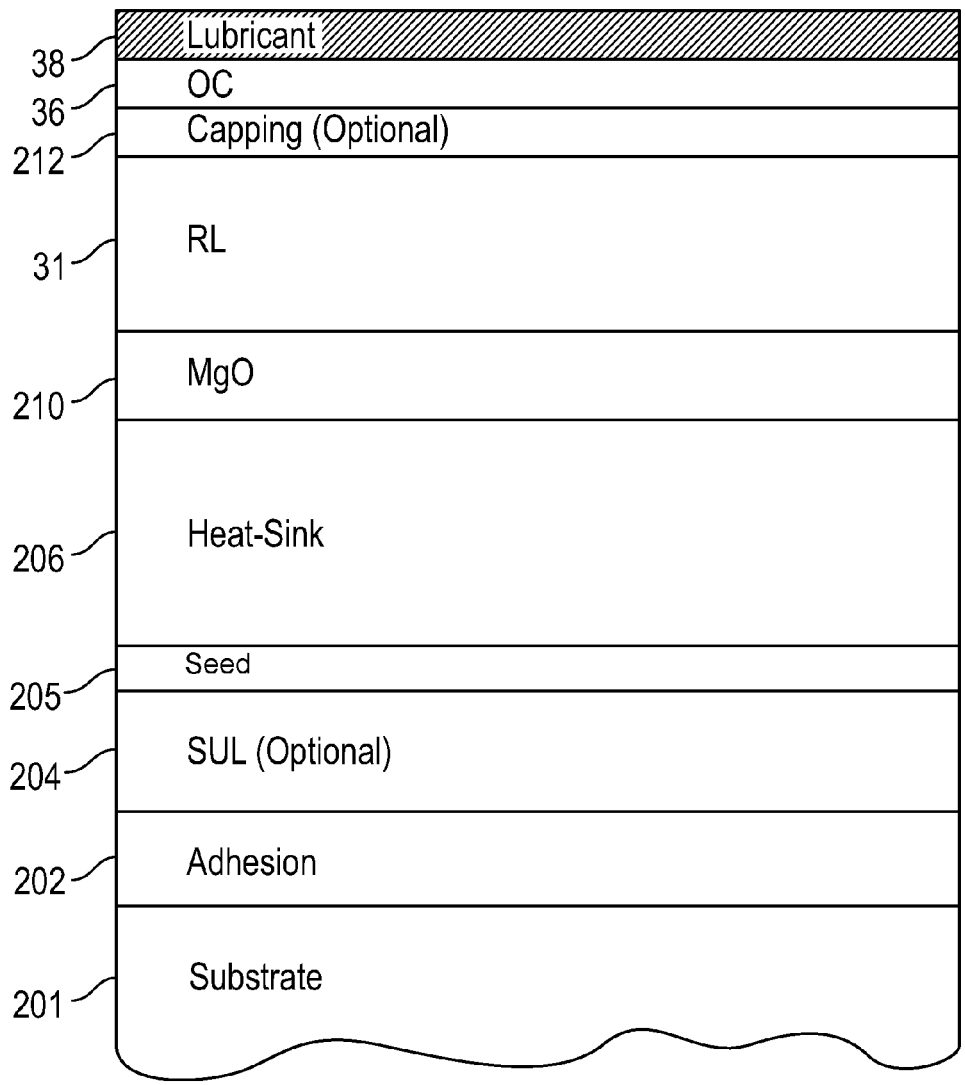
FIG. 3 is a sectional view showing a HAMR disk according with a single heat-sink layer according to the prior art.

FIG. 3 is a sectional view showing HAMR disk 200 with a continuous granular recording layer (RL) 31 according to the prior art. The recording layer 31 may be comprised of a substantially chemically-ordered FePt alloy (or CoPt alloy) as proposed in the prior art. The disk 200 is a substrate 201 having a generally planar surface on which the representative layers are sequentially deposited, typically by sputtering. The hard disk substrate 201 may be any commercially available high-temperature glass substrate, but may also be an alternative substrate, such as silicon or silicon-carbide. An adhesion layer 202, typically about 10-200 nm of an amorphous adhesion layer material like a CrTa or NiTa alloy, is deposited on substrate 201.

An optional soft underlayer (SUL) 204 of magnetically permeable material that serves as a flux return path for the magnetic flux from the write head may be formed on the adhesion layer 202. The SUL 204 may be formed of magnetically permeable materials that are also compatible with the high-temperature deposition process for FePt, such as certain alloys of CoFeZr and CoZr. The SUL 204 may also be a laminated or multilayered SUL formed of multiple soft magnetic films separated by nonmagnetic films, such as electrically conductive films of Al or CoCr. The SUL 204 may also be a laminated or multilayered SUL formed of multiple soft magnetic films separated by interlayer films that mediate an antiferromagnetic coupling, such as Ru, Ir, or Cr or alloys thereof. The SUL 204 may have a thickness in the range of about 5 to 100 nm.

A seed layer 205, for example a layer of RuAl or NiAl, is deposited on SUL 204, or on adhesion layer 202 if no SUL is used. A single layer heat-sink layer 206 is then deposited on seed layer 205. The heat-sink layer 206 facilitates the transfer of heat away from the RL to prevent spreading of heat to regions of the RL adjacent to where data is desired to be written, thus preventing overwriting of data in adjacent data tracks. The heat sink layer 206 may be formed of a material with high thermal conductivity, like Cu, Au, Ag, Cr, Mo or W or other suitable metals or metal alloys, with a typical thickness between about 5-200 nm.

A layer 210 of MgO is formed on the heat-sink layer 206 and acts as both the seed layer for the RL 31 and a thermal barrier layer.

The perpendicular media that forms the RL 31 is a high-anisotropy ($K_u$) substantially chemically-ordered FePt alloy (or CoPt alloy) with perpendicular magnetic anisotropy. Substantially chemically-ordered means that the FePt alloy has a composition of the form $Fe_{(y)}Pt_{(100-y)}$ where y is between about 45 and 55 atomic percent. Such alloys of FePt (and CoPt) ordered in $L1_0$ are known for their high magnetocrystalline anisotropy and magnetization, properties that are desirable for high-density magnetic recording materials. The substantially chemically-ordered FePt alloy, in its bulk form, is known as a face-centered tetragonal (FCT) $L1_0$-ordered phase material (also called a CuAu material). The c-axis of the $L1_0$ phase is the easy axis of magnetization and is oriented perpendicular to the disk substrate. The substantially chemically-ordered FePt alloy may also be a pseudo-binary alloy based on the FePt $L1_0$ phase, e.g., $(Fe_{(y)}Pt_{(100-y)})$—X, where y is between about 45 and 55 atomic percent and the element X may be one or more of Ni, Au, Cu, Pd, Mn and Ag and present in the range of between about 0% to about 20% atomic percent. While the pseudo-binary alloy in general has similarly high anisotropy as the binary alloy FePt, it allows additional control over the magnetic and other properties of the RL. For example, Ag improves the formation of the $L1_0$ phase and Cu reduces the Curie temperature. While the method will be described for fabricating media with a FePt RL, the method is also fully applicable to media with a CoPt (or a pseudo-binary CoPt—X alloy based on the CoPt $L1_0$ phase) RL.

FePt $L1_0$ phase based granular thin films exhibit strong perpendicular anisotropy, which potentially leads to small thermally stable grains for ultrahigh density magnetic recording. To fabricate small grain FePt $L1_0$ media some form of segregant to separate grains can be used as an integral part of the magnetic recording layer. Thus in the HAMR, the RL 31 also typically includes a segregant, such as one or more of C, $SiO_2$, $TiO_2$, $TaO_x$, $ZrO_2$, SiC, SiN, TiC, TiN, B, BC, and BN that forms between the FePt grains and reduces the grain size. While FIG. 3 depicts the RL 31 as a single magnetic layer, the recording layer may be a multilayer, for example multiple stacked FePt sublayers, each with a different segregant, as described in U.S. Pat. No. 9,406,329 B1 which is assigned to the same assignee as this application.

The FePt RL is sputter deposited, typically to a thickness of between about 4 to 15 nm, while the disk substrate 201 is maintained at an elevated temperature, for example between about 300 and 700° C. The FePt RL may be sputter deposited from a single composite target having generally equal atomic amounts of Fe and Pt and with the desired amounts of X-additives and segregant, or co-sputtered from separate targets.

An optional capping layer 212, such as a thin film of Co, may be formed on the RL 31. A protective overcoat (OC) 36 is deposited on the RL 31 (or on the optional capping layer 212), typically to a thickness between about 1-5 nm. OC 36 is preferably a layer of amorphous diamond-like carbon (DLC). The DLC may also be hydrogenated and/or nitrogenated, as is well-known in the art. On the completed disk, a liquid lubricant 38, like a perfluorpolyether (PFPE), is coated on OC 36.

Figure 4:
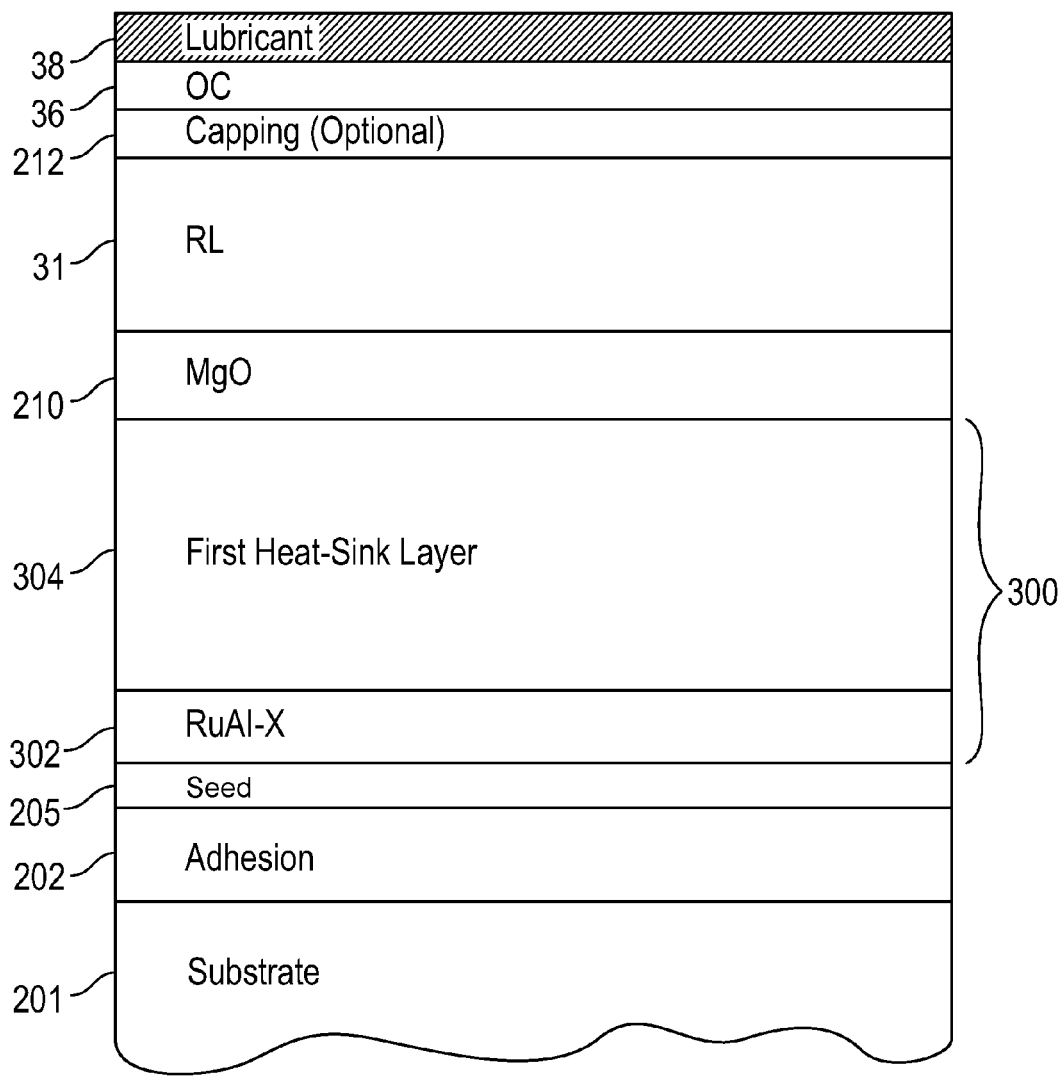
FIG. 4 is a sectional view showing a HAMR disk according to an embodiment of the invention.

FIG. 4 is a sectional view showing a HAMR disk with a continuous granular recording layer (RL) 31 with a multilayered or laminated heat-sink layer 300 according to an embodiment of the invention. In FIG. 4 the optional SUL layer is omitted. The laminated heat-sink layer 300 includes a first heat-sink layer 304 beneath the MgO layer 210 and a thermal barrier layer 302 between the first heat-sink layer 304 and the substrate 201. The first heat-sink layer 304 is preferably formed of Cu, Au, Ag, Cr, Mo or W. The RuAl—X thermal barrier layer 302 has a preferred composition of the form $(RuAl)_{(100-y)}X_y$, where y is greater than or equal to 0.5 and less than or equal to 10, and X is selected from C and one or more oxides of Si, Ti, W, Zr and Hf. The RuAl—X thermal barrier layer 302 may have a thickness preferably greater than or equal to 1 nm and less than or equal to 15 nm, and preferably less than about 20% of the total thickness of the laminated heat-sink layer 300. The RuAl—X thermal barrier layer 302 has a thermal conductivity substantially less than the thermal conductivity of the first heat-sink layer 304 and thus the laminated heat-sink layer 300 results in a reduction of the heat-sink effect from that of a single layer heat-sink layer of the same thickness. For example, Cr has a thermal conductivity of about 94 W/m-K (at 20° C.) while RuAl—X (where X is an oxide) has a thermal conductivity below 5 W/m-K.

Figure 5:
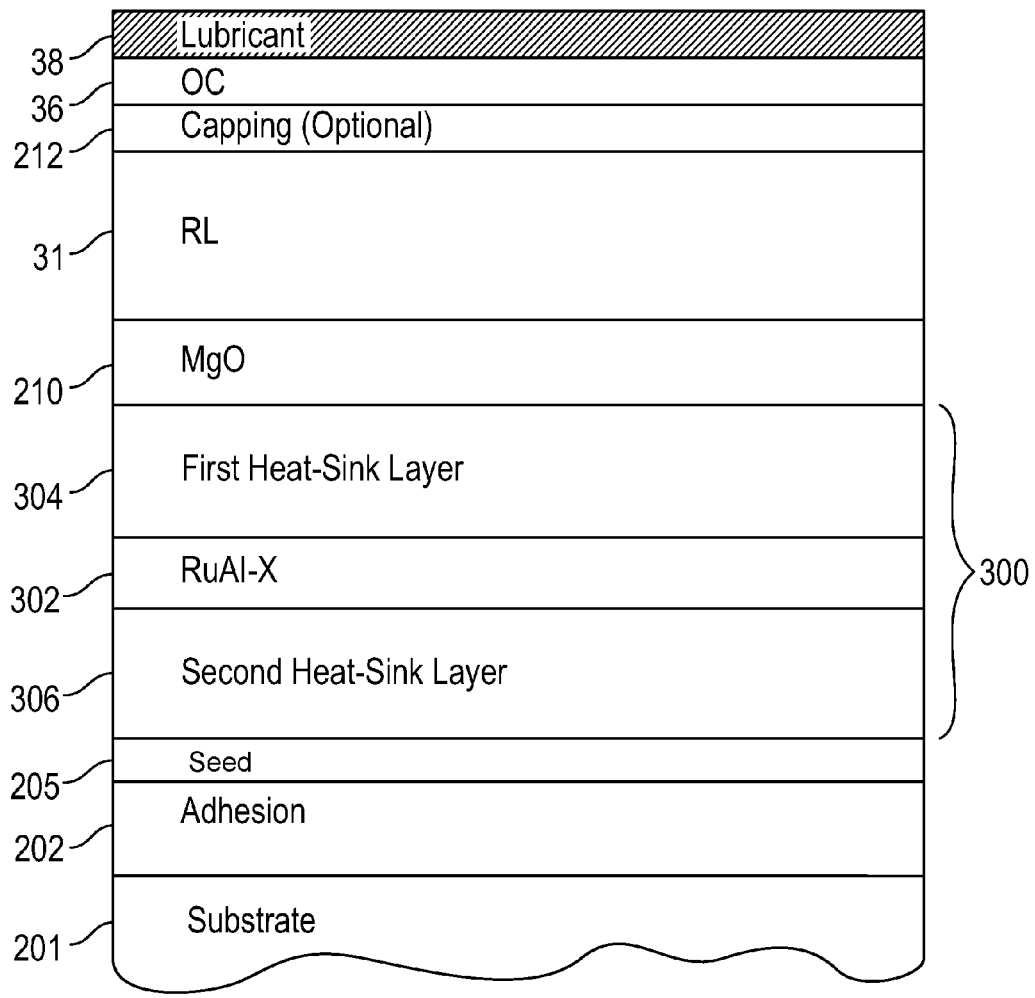
FIG. 5 is a sectional view showing a HAMR disk according to another embodiment of the invention.

FIG. 5 is a sectional view showing a HAMR disk with a continuous granular recording layer (RL) 31 with a multilayered or laminated heat-sink layer 300 according to another embodiment of the invention. In FIG. 5 the optional SUL layer is omitted. The laminated heat-sink layer 300 includes a second heat-sink layer 306 between the RuAl—X thermal barrier layer 302 and the substrate 201. In this embodiment, the first heat-sink layer 304 should have a thickness equal to or greater than 15% of the total thickness of the laminated heat-sink layer 300. Thus the Ru—Al—X thermal barrier layer 302 may be located at the bottom of the laminated heat-sink layer 300 (as shown in FIG. 4) or up to about 85% of the total thickness of the laminated heat-sink layer 300. If body-centered cubic (bcc) materials like Cr, Mo and W are selected as heat-sink materials then these materials should be used for both heat-sink layers 304, 306. Similarly, if face-centered cubic (fcc) materials like Cu, Au and Ag are selected then these materials should be used for both heat-sink layers 304, 306.

In one embodiment heat-sink layers 304, 306 were Cr and thermal barrier layer 302 was $(RuAl)_{96}(SiO_2)_4$. The total thickness of this laminated heat-sink layer 300 was 110 nm, the thickness of thermal barrier layer 302 was 3 nm and the thickness of the first heat-sink layer 304 was 33 nm. A HAMR disk with this laminated heat-sink layer was compared with a same HAMR disk but with a single Cr heat-sink layer of the same thickness (110 nm). The HAMR disk with this laminated heat-sink layer allowed a reduction in laser current of about 10% (6 mA). Also, there was an improvement in coercivity $H_c$ by about 1 kOe and an improvement in nucleation field $H_n$ by about 1 kOe.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A heat-assisted magnetic recording medium comprising:
   a substrate;
   a multilayered heat-sink structure on the substrate and comprising a first heat-sink layer and a thermal barrier layer between the substrate and the first heat-sink layer, the thermal barrier layer comprising RuAl—X, where X is selected from C and one or more oxides of Si, Ti, W, Zr and Hf;
   a magnetic recording layer comprising a chemically-ordered alloy selected from a FePt alloy and a CoPt alloy; and
   a seed layer for the recording layer on the heat-sink structure, wherein the recording layer is on and in contact with the seed layer.

2. The medium of claim 1 wherein the thermal barrier layer has a composition of the form $(RuAl)_{(100-y)}X_y$, where y is greater than or equal to 0.5 and less than or equal to 10.

3. The medium of claim 1 wherein the thermal barrier layer has a thickness greater than or equal to 1 nm and less than or equal to 15 nm.

4. The medium of claim 1 wherein the first heat-sink layer is selected from Cr, Mo, W, Cu, Au, Ag and their alloys.

5. The medium of claim 1 wherein the heat-sink structure further comprises a second heat-sink layer between the substrate and the thermal barrier layer.

6. The medium of claim 5 wherein the heat-sink structure has a thickness T and the first heat-sink layer has a thickness greater than or equal to 0.15 T.

7. The medium of claim 5 wherein each of the first and second heat-sink layers is selected from Cr, W, Mo and their alloys.

8. The medium of claim 5 wherein each of the first and second heat-sink layers is selected from Cu, Au, Ag and their alloys.

9. The medium of claim 5 wherein the thermal barrier layer comprises RuAl—$SiO_2$ and each of the first and second heat-sink layers comprises Cr.

10. The medium of claim 1 wherein the seed layer comprises MgO.

11. The medium of claim 1 wherein the magnetic recording layer comprises a substantially chemically-ordered alloy comprising Pt and an element selected from Fe and Co, and a segregant selected from one or more of C, $SiO_2$, $TiO_2$, $TaO_x$, $ZrO_2$, SiC, SiN, TiC, TiN, B, BC and BN.

12. The medium of claim 1 wherein the magnetic recording layer comprises a substantially chemically-ordered pseudo-binary FePtX alloy in the $L1_0$ phase, where X is one or more of Ni, Au, Cu, Pd, Mn and Ag.

13. A heat assisted magnetic recording (HAMR) disk drive comprising:
   the medium according to claim 1 wherein said medium is a rotatable HAMR disk; and
   a carrier maintained near the magnetic layer of said medium and supporting a near-field transducer.

14. A heat-assisted magnetic recording disk comprising:
   a substrate;
   a laminated heat-sink structure on the substrate and comprising first and second heat-sink layers and a thermal barrier layer between the first and second heat-sink layers, the thermal barrier layer comprising RuAl—X, where X is selected from C and one or more oxides of Si, Ti, W, Zr and Hf, the second heat-sink layer being between the substrate and the thermal barrier layer;
   a seed layer comprising MgO on the first heat-sink layer; and
   a magnetic recording layer comprising a chemically-ordered alloy selected from a FePt alloy and a CoPt alloy on and in contact with the seed layer.

15. The disk of claim 14 wherein the thermal barrier layer has a composition of the form $(RuAl)_{(100-y)}X_y$, where y is greater than or equal to 0.5 and less than or equal to 10.

16. The disk of claim 14 wherein the thermal barrier layer has a thickness greater than or equal to 1 nm and less than or equal to 15 nm.

17. The disk of claim 14 wherein the heat-sink structure has a thickness T and the first heat-sink layer has a thickness greater than or equal to 0.15 T.

18. The disk of claim 14 wherein each of the first and second heat-sink layers is selected from Cr, W, Mo and their alloys.

19. The disk of claim 14 wherein each of the first and second heat-sink layers is selected from Au, Cu, Ag and their alloys.

20. The disk of claim 14 wherein the thermal barrier layer comprises RuAl—$SiO_2$ and each of the first and second heat-sink layers comprises Cr.

21. The disk of claim 14 wherein the magnetic recording layer comprises a substantially chemically-ordered alloy comprising Pt and an element selected from Fe and Co, and a segregant selected from one or more of C, $SiO_2$, $TiO_2$, $TaO_x$, $ZrO_2$, SiC, SiN, TiC, TiN, B, BC and BN.

22. The disk of claim 14 wherein the magnetic recording layer comprises a substantially chemically-ordered pseudo-binary FePtX alloy in the $L1_0$ phase, where X is one or more of Ni, Au, Cu, Pd, Mn and Ag.

23. A heat assisted magnetic recording (HAMR) disk drive comprising:
   the disk according to claim 14; and
   an air-bearing slider maintained near the magnetic recording layer of said disk and supporting a near-field transducer.

* * * * *